(12) United States Patent
Stegmaier

(10) Patent No.: US 9,522,713 B2
(45) Date of Patent: Dec. 20, 2016

(54) VEHICLE OPERABLE WITH MUSCLE POWER AND/OR MOTOR POWER, AND METHOD FOR OPERATING THE VEHICLE

(71) Applicant: Robert Bosch GmbH, Stuttgart (DE)

(72) Inventor: Juergen Stegmaier, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/465,316

(22) Filed: Aug. 21, 2014

(65) Prior Publication Data

US 2015/0057855 A1 Feb. 26, 2015

(30) Foreign Application Priority Data

Aug. 22, 2013 (DE) .................... 10 2013 216 723

(51) Int. Cl.
| | |
|---|---|
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |

(Continued)

(52) U.S. Cl.
CPC .................. *B62M 6/45* (2013.01); *B62M 6/50* (2013.01); *B62K 2204/00* (2013.01)

(58) Field of Classification Search
CPC ............. B62M 6/45; B62M 6/55; B62M 6/60; B62M 6/50; B62M 6/90; B62M 6/40; B62M 6/75; B62M 2701/0069; B62M 6/65; B62M 7/12; B62M 11/14; B62M 6/15; B60L 11/1838;B60L 15/20; B60L 3/04; B60L 1/02; B60L 11/02; B60L 1/14; B62K 2207/04; B62K 21/12; B62K 23/04; B62K 25/005; B62K 25/04; B62K 23/02; B62K 19/34
USPC ..................... 701/37, 22, 49, 51, 99, 1, 2, 41
See application file for complete search history.

(56) References Cited

U.S. PATENT DOCUMENTS 5,226,501 A * 7/1993 Takata ................ B60L 15/2063
180/19.1
5,602,448 A * 2/1997 Yaguchi .............. B60L 11/1801
180/179

(Continued)

FOREIGN PATENT DOCUMENTS

| EP | 0687454 | 12/1995 |
|---|---|---|
| EP | 0738653 | 10/1996 |

(Continued)

*Primary Examiner* — Calvin Cheung
*Assistant Examiner* — Luis A Martinez Borrero
(74) *Attorney, Agent, or Firm* — Norton Rose Fulbright US LLP; Gerard Messina

(57) ABSTRACT

A vehicle operable with human muscle power and/or motor power, e.g., an electric bicycle, includes: a crank drive through which a rider torque generated by a rider is introduced; an electrical drive system that can additionally apply a driving torque; and a control unit configured to shut off the electrical drive system when the rider torque is not present. The control unit encompasses a monitoring device which ensures that when the rider torque falls below a predetermined value, the electrical drive system continues to be operated for a specified time span, the duration of the time span being variable as a function of a pedaling frequency.

10 Claims, 2 Drawing Sheets

(51) Int. Cl.
*B62M 6/45* (2010.01)
*B62M 6/50* (2010.01)

(56) References Cited

U.S. PATENT DOCUMENTS

| | | | | |
|---|---|---|---|---|
| 5,777,442 A * | 7/1998 | Miyata | B60L 11/1801 | 180/206.2 |
| 5,836,414 A * | 11/1998 | Seto | B62M 6/70 | 180/206.1 |
| 6,446,745 B1 * | 9/2002 | Lee | B60L 1/14 | 180/206.2 |
| 8,655,534 B2 * | 2/2014 | Yang | B60L 11/007 | 440/1 |
| 8,820,459 B2 * | 9/2014 | Hashimoto | B62M 6/55 | 180/206.3 |
| 8,857,550 B2 * | 10/2014 | Kim | B62K 3/10 | 180/206.2 |
| 8,886,376 B2 * | 11/2014 | Aoki | B62M 6/45 | 701/22 |
| 9,002,555 B2 * | 4/2015 | Son | B60L 11/007 | 180/206.2 |
| 9,026,288 B2 * | 5/2015 | Durdevic | B62M 6/45 | 701/22 |
| 2004/0084238 A1 * | 5/2004 | Yokotani | B62J 99/00 | 180/206.2 |
| 2005/0140113 A1 * | 6/2005 | Kokatsu | A63B 22/0605 | 280/205 |
| 2005/0246152 A1 * | 11/2005 | Kokatsu | B62M 6/45 | 703/22 |
| 2007/0187952 A1 * | 8/2007 | Perlo | B60L 8/00 | 290/1 R |
| 2008/0177433 A1 * | 7/2008 | Teo | B60L 11/1801 | 701/22 |
| 2009/0095552 A1 * | 4/2009 | Gulas | B62M 6/45 | 180/206.5 |
| 2011/0266082 A1 * | 11/2011 | Yang | B60L 11/007 | 180/206.5 |
| 2011/0267178 A1 * | 11/2011 | Nishihara | B62K 23/02 | 340/12.39 |
| 2012/0061161 A1 * | 3/2012 | Jang | B62M 6/60 | 180/220 |
| 2012/0202649 A1 * | 8/2012 | Huber | A63B 69/16 | 482/2 |
| 2012/0241264 A1 * | 9/2012 | Hosaka | B60L 7/14 | 188/156 |
| 2012/0303195 A1 * | 11/2012 | Boyle | B62M 6/50 | 701/22 |
| 2013/0006463 A1 * | 1/2013 | Yang | B60L 11/007 | 701/22 |
| 2013/0093187 A1 * | 4/2013 | Lim | H02K 13/00 | 290/50 |
| 2013/0110335 A1 * | 5/2013 | Durdevic | B62M 6/45 | 701/22 |
| 2014/0076652 A1 * | 3/2014 | Kim | B62K 3/10 | 180/220 |
| 2014/0081494 A1 * | 3/2014 | Chun | B62M 6/45 | 701/22 |
| 2014/0081495 A1 * | 3/2014 | Son | B60L 11/007 | 701/22 |
| 2014/0081496 A1 * | 3/2014 | Chun | B60L 11/00 | 701/22 |
| 2015/0041234 A1 * | 2/2015 | Frieden | B62M 7/12 | 180/220 |
| 2015/0073656 A1 * | 3/2015 | Takamoto | B62J 1/06 | 701/37 |
| 2015/0101874 A1 * | 4/2015 | Getta | B62M 6/55 | 180/206.4 |

FOREIGN PATENT DOCUMENTS

| | | |
|---|---|---|
| EP | 1236640 | 9/2002 |
| EP | 2436589 | 4/2012 |
| EP | 2444311 | 4/2012 |
| JP | H 08-295285 | 11/1996 |
| JP | 2003-054480 | 2/2003 |
| JP | 2005-041352 | 2/2005 |

* cited by examiner

VEHICLE OPERABLE WITH MUSCLE POWER AND/OR MOTOR POWER, AND METHOD FOR OPERATING THE VEHICLE

BACKGROUND OF THE INVENTION

1. Field of the Invention

The present invention relates to a vehicle operable with muscle power and/or motor power, in particular an electric bicycle, and to a method for operating the vehicle operable with muscle power and/or motor power.

2. Description of the Related Art

Vehicles of this kind are known, for example, as electric bicycles having an additional electrical drive system, the electrical drive system being capable of assisting riding of the vehicle when pedaling, up to a predetermined maximum speed (e.g. 25 km/h). In such electric bicycles, the requirement can further exist for switching off the electrical drive system as soon as the rider ceases pedaling. Electric bicycles of this kind often encompass a sensor for determining a crank position and/or a rotation speed sensor for determining a rotation speed of the crank. With these sensors, a pedal standstill can be detected and shutoff of the electrical drive system can be initiated. An alternative to these sensors is based on an evaluation of a torque curve at the pedal shaft. A shutoff criterion here must be a rider torque applied by a rider is no longer being measured. Because of the top and bottom dead center points of the crank drive, a sinusoidal signal curve for rider torque can be sensed at the pedal shaft. This approach, however, would result in an undesired periodic shutoff of the electrical drive system at the bottom dead center point of the crank drive. In practice, therefore, a monitoring device is provided that starts a counter when the rider torque falls below a defined threshold. If the rider torque does not rise again within a defined, fixed time span, the electrical drive is shut off. The length of this predetermined time span is constant. As a result of this predetermined time span in which the electrical drive system is not yet interrupted, the electric bicycle continues to be driven by the electrical drive system even though the rider has ceased pedaling. This is perceived by many riders as obtrusive, however, since the electric bicycle does not immediately implement the rider's input. A further series of problems results in particular with hub gear systems, since run-on of the electrical drive system during shifting is unfavorable because with hub gear systems, a gear change cannot occur under high chain loads. The rider must therefore, after the cessation of pedaling, additionally wait for the predetermined time period until a successful gear change is possible. A reduction in the predetermined time span during which the electrical drive system continues to run also does not solve the problem, since assistance by the electrical drive system would be regularly interrupted in particular in a context of low and irregular pedaling frequencies with pronounced low points in the muscle-generated torque. This, however, results in very rough and uncomfortable riding behavior.

BRIEF SUMMARY OF THE INVENTION

The vehicle according to the present invention operable with muscle power and/or motor power has, in contrast, the advantage that the shutoff behavior for an electrical drive system can be adapted to the particular riding situation. According to the present invention, with a very simple and economical configuration, reliable sensing of a cessation of pedaling by the rider is achieved, and rapid shutoff of the electrical drive system is thus enabled. Reducing the run-on properties of the electrical drive system furthermore allows the safety of the vehicle to be enhanced. In particular, faster shifting operations are possible in particular with hub gear systems. A power consumption of the electrical drive system can furthermore be reduced as a result of the shorter run-on of the electrical drive system made possible according to the present invention, and range is thus increased. This is achieved according to the present invention in that the vehicle encompasses a crank drive and an electrical drive system that can additionally apply a driving torque. The vehicle furthermore encompasses a control unit that is set up to shut off the electrical drive system when the rider torque is not present. The control unit encompasses a monitoring device that ensures that when the rider torque falls below a predetermined value, the electrical drive system continues to be operated for a predetermined time span. A length of the predetermined time span is determined variably as a function of a pedaling frequency of the rider at the crank drive. The present invention thus defines a variable time span for run-on of the electrical drive system, which time span depends on the rider's pedaling frequency. The result according to the present invention is that undesired excessively long run-on of the electrical drive system after the rider has ceased pedaling can be avoided.

The control unit is preferably set up to set the variable predetermined time span to be shorter with increasing pedaling frequency. This takes account of the fact that as the pedaling frequency increases, a time span around the bottom dead center point becomes shorter, so that a shorter run-on time for the electrical drive system is sufficient.

Also preferably, the control unit is set up to determine the rider's pedaling frequency as a function of a rotation speed of the electrical drive system. Data that usually are in any case already sensed in such vehicles, namely the rotation speed of the electrical drive system, could additionally be used here to determine the rider's pedaling frequency. This is possible because in such vehicles, the rotation speed of the electrical drive is usually determined by the rider torque applied by the rider.

Alternatively, the control device is set up to determine the rider's pedaling frequency as a function of a maximum of the rider torque and/or a minimum of the rider torque. the maximum of the rider torque is usually reached at the top dead center point of the crank drive, and the minimum of the torque is usually reached at the bottom dead center point of the crank drive. Here as well, an additional sensor is usually unnecessary; instead, the data regarding rider torque that are in any case already sensed can additionally be used to determine the pedaling frequency.

Also alternatively, the vehicle furthermore encompasses a sensor for direct determination of the rider's pedaling frequency.

In order to ensure the smoothest possible adaptation of the run-on of the electrical drive system, the control unit is set up to continuously adapt the predetermined variable time span to the rider's pedaling frequency.

For a particularly compact configuration, the electrical drive system is preferably disposed on the crank drive of the vehicle. With electric bicycles in particular, a very low center of gravity can thereby be achieved and a driving torque of the electrical drive system can be delivered directly to the crank drive.

Particularly preferably, the vehicle according to the present invention is an electric bicycle, and in particular a so-called "pedelec."

The present invention furthermore relates to a method for operating a vehicle operable with muscle power and/or motor power, in particular an electric bicycle, the vehicle encompassing a crank drive for applying a rider torque as well as an electrical drive system. The method according to the present invention encompasses the steps of determining a pedaling frequency at which a rider is actuating the crank drive, and determining a predetermined time span over which the electrical drive system is still to be operated after a rider has ceased pedaling, the predetermined time span being determined variably as a function of the rider's pedaling frequency. In other words, provision is made according to the present invention that a different predetermined time span is determined for each pedaling frequency at which the rider can exert a rider torque on the vehicle. According to the present invention the predetermined time span can thus always be adapted variably to the rider's particular pedaling frequency, and undesirably long run-on of the electrical drive system is thus avoided.

As already explained in the context of the vehicle according to the present invention, the pedaling frequency is determined preferably without a separate sensor, but instead by way of a rotation speed of the electrical drive system and/or by way of a maximum and/or minimum of the rider torque. Alternatively, a separate sensor can also be provided for determining the rider's pedaling frequency.

Also preferably, the predetermined time span over which the electrical drive system runs on is continuously adapted to the rider's pedaling frequency. A new predetermined time span is preferably calculated by the control device after each revolution, and is outputted as a predetermined time span if the rider stops pedaling.

DETAILED DESCRIPTION OF THE INVENTION

An electric bicycle 1 according to a preferred exemplifying embodiment of the invention will be described below in detail with reference to FIGS. 1 to 3.

Figure 1:
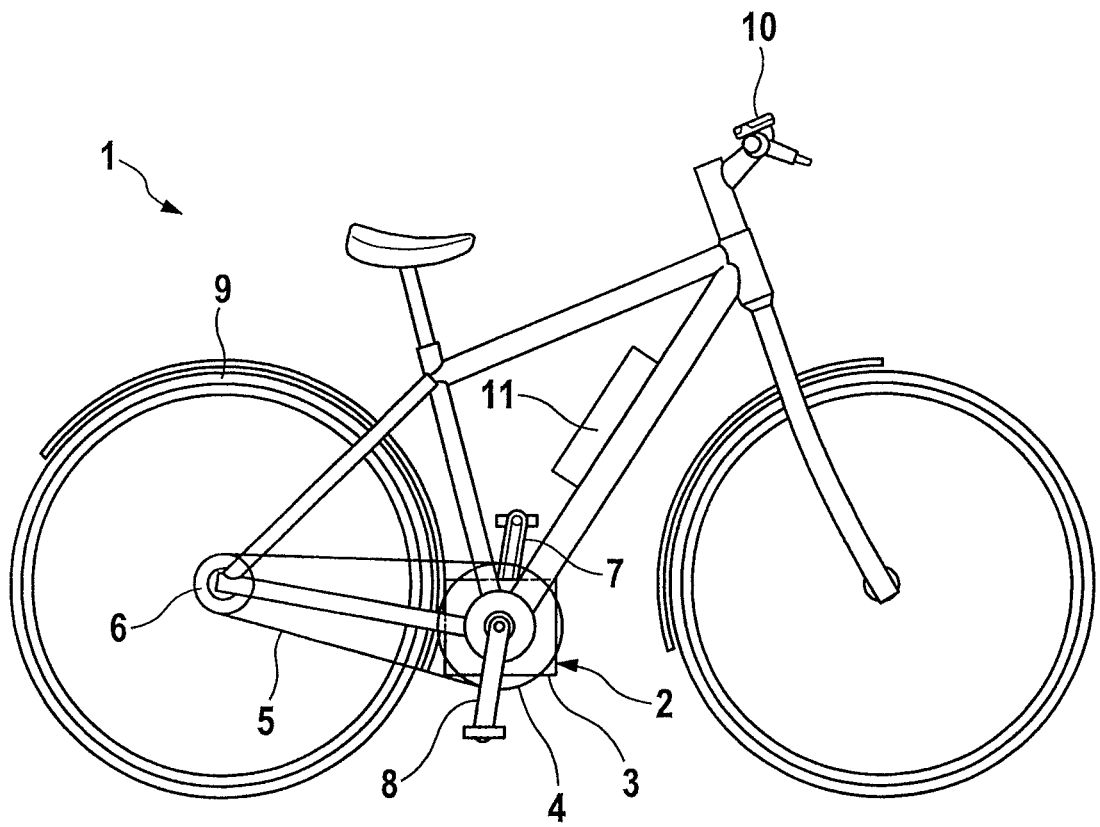
FIG. 1 is a schematic view of an electric bicycle according to a preferred exemplifying embodiment of the invention.

As is evident from FIG. 1, electric bicycle 1 encompasses a crank drive 2 having two cranks 7, 8 on which pedals are disposed. Also provided is an electrical drive system 3 that is disposed on crank drive 2. A manually shifted transmission 6 is provided on rear wheel 9 of the electric bicycle.

A drive torque can be furnished by the rider in the form of a rider torque, and/or by way of electrical drive system 3, and is transferred by a chainwheel 4 on crank drive 2, via a chain 5, to a sprocket of manually shifted transmission 6.

A control unit 10 that is connected to electrical drive system 3 is also provided on the handlebars of electric bicycle 1. The reference character 11 furthermore designates a rechargeable battery that serves to supply power to electrical drive system 3.

Control unit 10 furthermore also encompasses, in particular, a mechanical interface to the rider, for example pushbuttons or sliders or the like, with which the rider can set a desired level of assistance by electrical drive system 3.

Be it noted that control unit 10 can in particular also be integrated into electrical drive system 3, and only a mechanical interface for the rider is provided on the handlebars.

According to the present invention, control unit 10 is set up in such a way that electrical drive system 3 is shut off in the absence of a rider torque applied by the rider. Control unit 10 encompasses for this purpose a monitoring device which ensures that when the rider torque falls below a predetermined value, electrical drive system 3 is still operated for a predetermined time span. This prevents the electrical drive system from being automatically shut off, in the context of the sinusoidally occurring rider torque that is evident in particular in FIG. 2, when the bottom dead center point UT, at which the rider torque is equal to zero, is reached.

Figure 2:
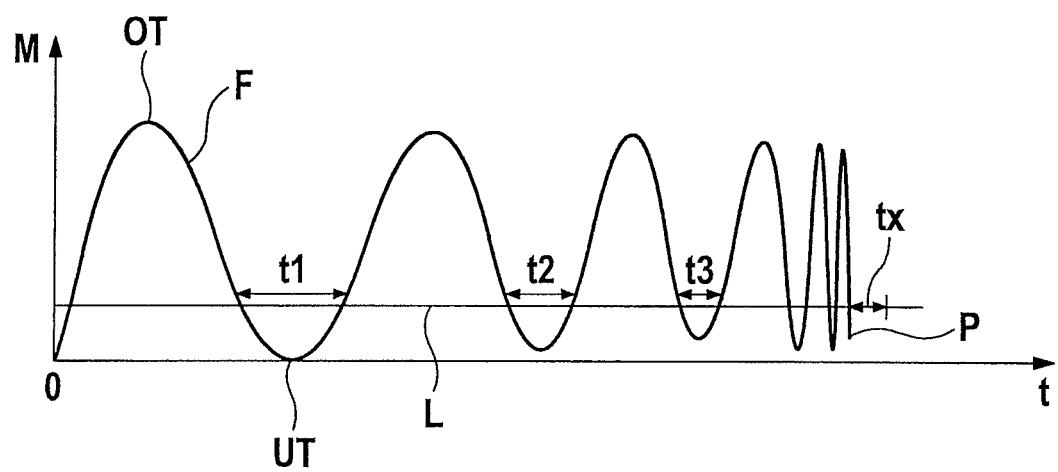
FIG. 2 is a diagram showing a rider torque applied by the rider plotted against time.
Figure 3:
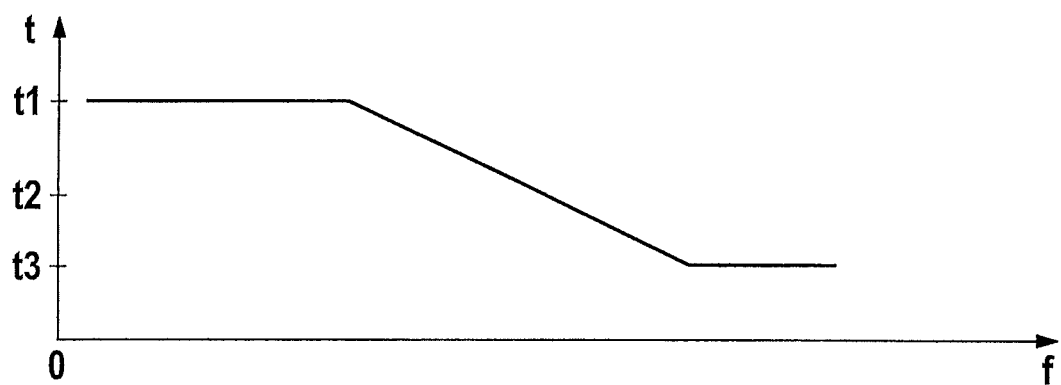
FIG. 3 is a diagram showing a predetermined time of a run-on of an electrical drive system of the electric bicycle, plotted against the rider's pedaling frequency.

FIG. 2 shows the rider torque M plotted against time t. The top dead center point OT and bottom dead center point UT can be ascertained from the sinusoidal curve F. As is further evident from FIG. 2, a lower threshold for the rider torque M is provided, which threshold is indicated by the line L. As is evident from FIG. 2, the closer the torque curve comes to the bottom dead center point UT, the lower the rider torque M becomes.

In order now to prevent electrical drive system 3 from being switched off by control unit 10, starting at the line L that identifies the torque threshold the monitoring device of control unit 10 is instructed to ensure that even though the rider torque has fallen below the predetermined value (line L), electrical drive system 3 continues to be operated for a predetermined time span. FIG. 2 depicts three different time spans t1, t2, and t3. This indicates clearly that in the exemplifying embodiment depicted, over the course of time t the rider's pedaling frequency becomes higher and higher and time spans t1, t2, and t3 become shorter and shorter. The predetermined time spans over which the monitoring unit continues to drive electric motor 3 also become shorter and shorter.

As is evident from FIG. 2, first time span t1 is longer than second time span t2, and second time span t2 is longer than third time span t3.

Control unit 10 according to the present invention is thus set up to define the respective durations t1, t2, t3 of the predetermined time space variably as a function of the pedaling frequency of the rider torque M. This ensures that at a relatively low pedaling frequency electrical drive system 3 is not shutoff too early, and at a relatively high pedaling frequency electrical drive system 3 does not continue to be operated for too long as soon as the rider ceases pedaling. In FIG. 2 the rider ceases pedaling at time P, so that control 10 is still defining a short predetermined time span tx in which electrical drive system 3 is still operated.

The present invention thus ensures that as the rider's pedaling frequency rises, the time span t1, t2, t3, tx during which the rider torque falls below the threshold L decreases. Corresponding to FIG. 2, FIG. 3 depicts the maximum time span t as a function of pedaling frequency f.

Thanks to a time t for the run-on of electrical drive system 3 which continuously decreases as pedaling frequency f rises, a follow-on behavior of the electrical drive system is appreciably improved (shorter) without causing an undesired shutoff of the electrical drive system at the dead center points, in particular the bottom dead center points, of the pedal revolution. The present invention in particular also makes it possible to begin a gear change immediately after pedaling ends, especially in the case of hub gear systems, without thereby cause excessive stress on components.

What is claimed is:

1. A vehicle configured as an electric bicycle operable with at least one of muscle power of a rider and motor power, comprising:
 a crank drive through which a rider torque generated by a rider is introduced;
 an electrical drive system configured to selectively apply a driving torque; and
 a control unit configured to shut off the electrical drive system when the rider torque is not present, wherein the control unit includes a monitoring device which ensures that when the rider torque falls below a predetermined value and then ceases at a particular time, the electrical drive system continues to be operated for a target time span starting from the particular time and is stopped upon expiration of the target time span, and wherein a duration of the target time span is varied as a function of a pedaling frequency of the rider.

2. The vehicle as recited in claim 1, wherein the control unit adjusts the target time span to be shorter with increasing pedaling frequency.

3. The vehicle as recited in claim 2, wherein the control unit determines the rider's pedaling frequency as a function of a rotation speed of the electrical drive system.

4. The vehicle as recited in claim 2, wherein the control device determines the rider's pedaling frequency as a function of at least one of a maximum of the rider torque and a minimum of the rider torque.

5. The vehicle as recited in claim 2, further comprising:
 a sensor determining the rider's pedaling frequency.

6. The vehicle as recited in claim 2, wherein the control unit continuously adapts the target time span to the rider's pedaling frequency.

7. The vehicle as recited in claim 6, wherein the electrical drive system is disposed on the crank drive.

8. A method for operating a vehicle configured as an electric bicycle operable with at least one of muscle power of a rider and motor power, the vehicle including a crank drive and an electrical drive system, the method comprising:
 determining a pedaling frequency at which a rider is actuating the crank drive;
 adapting a target time span over which the electrical drive system is operated when the rider ceases pedaling, the target time span being adjusted as a function of the pedaling frequency; and
 operating the electrical drive system in accordance with the target time span by continuing to operate the electrical drive system after the rider ceases pedaling at a particular time, wherein the electrical drive system continues to be operated for the target time span starting from the particular time and is stopped upon expiration of the target time span.

9. The method as recited in claim 8, wherein the rider's pedaling frequency is determined by using least one of a rotation speed of the electrical drive system, a maximum of the rider torque, a minimum of the rider torque, and a sensor.

10. The method as recited in claim 9, wherein the target time span is continuously adapted to the rider's pedaling frequency.

* * * * *